United States Patent
Kaneko et al.

(10) Patent No.: US 7,337,739 B2
(45) Date of Patent: Mar. 4, 2008

(54) STEERING-FORCE DETECTION DEVICE FOR STEERING HANDLE OF VEHICLE

(75) Inventors: Yoshiyuki Kaneko, Shizuoka-ken (JP); Yoshinori Harada, Shizuoka-ken (JP); Yutaka Mizuno, Shizuoka-ken (JP); Tomoyoshi Koyanagi, Shizuoka-ken (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 424 days.

(21) Appl. No.: 11/146,980

(22) Filed: Jun. 7, 2005

(65) Prior Publication Data

US 2006/0037522 A1 Feb. 23, 2006

(30) Foreign Application Priority Data

Jun. 7, 2004 (JP) ............... 2004-169257
Jun. 28, 2004 (JP) ............... 2004-189353

(51) Int. Cl.
*B63H 5/125* (2006.01)
(52) U.S. Cl. ............... 114/144 R; 114/55.52; 440/61 S; 180/417; 180/444
(58) Field of Classification Search ............... 180/444, 180/423, 417; 114/144 R, 150, 55.52; 440/61 S
See application file for complete search history.

(56) References Cited

U.S. PATENT DOCUMENTS

| | | | |
|---|---|---|---|
| 4,556,005 A | 12/1985 | Jackson | |
| 4,949,662 A | 8/1990 | Kobayashi | |
| 4,972,792 A | 11/1990 | Yokoyama et al. | |
| 5,094,182 A | 3/1992 | Simner | |
| 5,113,777 A | 5/1992 | Kobayashi | |
| 5,167,547 A | 12/1992 | Kobayashi et al. | |
| 5,429,533 A | 7/1995 | Kobayashi et al. | |

(Continued)

FOREIGN PATENT DOCUMENTS

| | | |
|---|---|---|
| CA | 2271332 | 2/2000 |
| WO | WO 00/40462 | 7/2000 |

OTHER PUBLICATIONS

Advertisement for trim adjuster for Sea-Doo watercraft—Personal Watercraft Illustrated, Aug. 1998.
Advertisement for trim adjuster—Jet Sports, Aug. 1997.
Advertisement for Fit and Trim and Fit and Trim II—Jet Sports. Aug. 1996.
Co-Pending U.S. Appl. No. 11/146,728 filed Jun. 7, 2005. Title: Steering Force Detection Device for Steering Handle of Vehicle. Inventors: Yoshiyuki Kaneko et al.

*Primary Examiner*—Tony Winner
(74) *Attorney, Agent, or Firm*—Knobbe, Martens, Olson & Bear, LLP (57) ABSTRACT

Steering-force detection sections, including a pressure-receiving section and a received-pressure detection section, are spaced from one another in the vicinity of a steering shaft. The steering shaft can include a pressing member for applying pressure to the pressure-receiving section when steering handlebars are rotated in either direction to the maximum steering angle. The pressure-receiving section and the received-pressure detection section are coaxially mounted in a pressure-receiving section casing and a detection section casing, respectively, through a guide tube, so that the pressure-receiving directions of both the pressure-receiving sections are parallel to one another and perpendicular to the direction in which the steering-force detection sections are spaced. The detection section casing includes mounting openings for mounting the received-pressure detecting sections and an electric circuit board, which is integrally connected to the received-pressure detecting sections. The mounting openings are formed in the same direction as each other and perpendicularly to the pressure-receiving direction of the pressure-receiving section.

7 Claims, 9 Drawing Sheets

U.S. PATENT DOCUMENTS

| | | |
|---|---|---|
| 5,520,133 A | 5/1996 | Wiegert |
| 5,591,057 A | 1/1997 | Dai et al. |
| 6,062,154 A | 5/2000 | Ito |
| 6,159,059 A | 12/2000 | Bernier et al. |
| 6,171,159 B1 | 1/2001 | Shen et al. |
| 6,174,210 B1 | 1/2001 | Spade et al. |
| 6,178,907 B1 | 1/2001 | Shirah et al. |
| 6,202,584 B1 | 3/2001 | Madachi et al. |
| 6,244,914 B1 | 6/2001 | Freitag et al. |
| 6,314,900 B1 | 11/2001 | Samuelsen |
| 6,332,816 B1 | 12/2001 | Tsuchiya et al. |
| 6,336,833 B1 | 1/2002 | Rheault et al. |
| 6,336,834 B1 | 1/2002 | Nedderman, Jr. et al. |
| 6,390,862 B1 | 5/2002 | Eichinger |
| 6,415,729 B1 | 7/2002 | Nedderman, Jr. et al. |
| 6,428,372 B1 | 8/2002 | Belt |
| 6,443,785 B1 | 9/2002 | Swartz et al. |
| 6,478,638 B2 | 11/2002 | Matsuda et al. |
| 6,523,489 B2 | 2/2003 | Simard et al. |
| 6,827,031 B2 | 12/2004 | Aoyama |
| 2003/0089166 A1* | 5/2003 | Mizuno et al. ............. 73/118.1 |
| 2004/0147179 A1* | 7/2004 | Mizuno et al. ................ 440/1 |

* cited by examiner

STEERING-FORCE DETECTION DEVICE FOR STEERING HANDLE OF VEHICLE

PRIORITY INFORMATION

This application claims priority to Japanese patent application Serial No. 2004-189353, filed on Jun. 28, 2004, and to Japanese patent application Serial No. 2004-169257, filed on Jun. 7, 2004, the entire contents of each of these priority applications are hereby expressly incorporated by reference.

BACKGROUND OF THE INVENTIONS

1. Field of the Inventions

The present inventions relate to a steering-force detection device for a steering handle of a vehicle.

2. Description of the Related Art

Many conventional vehicles are steerable by operating a steering handle. Such vehicles include small planing boats, for example.

Some small planing boats are provided with a throttle lever disposed in the vicinity of a grip of the steering handle. The engine is operated to propel the boat according to operation of the throttle lever, and the moving direction of the boat is changed according to operation of the steering handle. In some conventional small planing boats, engine output can be increased by operating the steering handle, improving the steerability of the small planing boat when, for example, running at a low speed for docking (see Japanese Patent Publication JP-A-2001-329881, for example).

Such small planing boats generally include a throttle opening detection means, which detects the opening of a throttle valve that opens and closes according to operation of the throttle lever. Such small planing boats generally also include a steering angle detection means, which detects the steering angle of the steering handle, a running speed detection means, which detects the running speed of the small planing boat, and an engine output control means, which controls the engine output.

The engine output control means increases the engine's output when: a value representing the throttle opening (detected by the throttle opening detection means) is less than a predetermined value, a value representing the steering angle (detected by the steering angle detection means) is more than a predetermined value, and a value representing the running speed (detected by the running speed detection means) is more than a predetermined value.

In the foregoing conventional small planing boats, however, the degree of increase in engine output due to operation of the steering handle cannot be adjusted by the boat operator, since the engine output increases automatically when the value corresponding to the steering angle of the steering handle reaches the predetermined value.

SUMMARY OF THE INVENTIONS

The preferred embodiments of the present steering-force detection device for a steering handle of a vehicle have several features, no single one of which is solely responsible for their desirable attributes. Without limiting the scope of this steering-force detection device as expressed by the claims that follow, its more prominent features will now be discussed briefly. After considering this discussion, and particularly after reading the section entitled "Detailed Description of the Preferred Embodiments," one will understand how the features of the preferred embodiments provide advantages, which include accurate positioning of device components within a casing, and increased accuracy of the detection device.

Small planing boats may be provided with a steering-force detection device for controlling engine output according to the steering force applied to the steering handle. In such boats, however, a casing of the steering-force detection device is preferably machined accurately in order to provide an accurate detection of the steering force. In addition, the components of the steering-force detection device are preferably mounted inside the casing in a manner that further improves the accuracy of the steering-force detection device.

In accordance with one embodiment, the steering-force detection device can comprise paired steering-force detection sections. Each section includes a pressure-receiving section and a received-pressure detection section. The paired steering-force detection sections are provided in spaced relation from each other in a vicinity of a steering shaft connected to the steering handle so as to be rotatable in opposite directions according to operation of the steering handle.

When the steering handle is rotated to its maximum steering angle in either direction, pressing sections provided in the steering handle or steering shaft apply pressure to the pressure-receiving section of a corresponding one of the paired steering-force detection sections. To detect the steering force applied to the steering handle, the received-pressure detection sections detect a pressure-receiving state of the pressure-receiving sections, which receive pressure from the pressing sections.

The steering-force detection device can further comprise an electric circuit board connected to the received-pressure detection sections, a pressure-receiving section casing, and a detection section casing. The pressure-receiving section casing preferably includes a pressure-receiving section mounting cavity for housing the pressure-receiving section.

The detection section casing is preferably formed in a continuous manner with two received-pressure detection section mounting cavities for housing the received-pressure detection sections, and a circuit board housing recess for housing the electric circuit board. The two received-pressure detection section mounting cavities are formed along a pressure-receiving direction of the pressure-receiving section. The two received-pressure detection section mounting cavities and the circuit board housing recess are respectively formed with a mounting opening for the received-pressure detection section and the electric circuit board. The mounting openings are formed in the same direction as each other and perpendicular to the pressure-receiving direction of the pressure-receiving section.

In the embodiment described above, the paired steering-force detection sections are spaced from one other, and, when the steering handle is rotated to its maximum steering angle in either direction, one of the pressing sections provided in the steering shaft contacts the pressure-receiving section of the corresponding steering-force detection section. The received-pressure detection section of the steering-force detection section thus detects the steering force applied to the steering handle by the operator. By increasing the engine output when the steering-force detection sections detect the steering force, the steering feeling is improved when the vehicle is running at a low speed. The engine output may be controlled according to the magnitude of the steering force detected by the steering-force detection section, thus further improving the steering feeling.

In some embodiments, the vehicle may be a small planing boat such as a water jet propulsion boat. In other embodiments, the above steering-force detection device may be used for controlling various devices installed in a vehicle. In such embodiments, the vehicle may be of various types including motorcycles, automobiles, and snowmobiles.

In some embodiments of the steering-force detection device, the engine output is not modified when the steering handle occupies a steering angle less than the maximum steering angle. Therefore, the vehicle operates normally when the steering handle occupies a steering angle less than the maximum steering angle. Further, the two received-pressure detection sections and the electric circuit board are connected and integrated with each other. This assemblage can then be housed in the detection section casing, which preferably has two received-pressure detection section mounting cavities and a circuit board housing recess. This configuration facilitates the assembly of the two received-pressure detection sections and the electric circuit board to the detection section casing and simplifies a procedure for mounting of these sections to the associated vehicle.

Since the mounting openings of the detection section casing for the received-pressure detection sections and the electric circuit board extend in the same direction as one other, the two received-pressure detection sections and the electric circuit board (after they are integrated) can be inserted into the detection section casing from the same direction. This configuration further facilitates the assembly of the two received-pressure detection sections and the electric circuit board with the detection section casing. Also, the mounting openings of the detection section casing that receive the received-pressure detection sections and the electric circuit board are formed perpendicular to the pressure-receiving direction of the pressure-receiving sections. Thus, the two received-pressure detection sections and the electric circuit board can be assembled with the detection section casing so as not to rattle.

In some preferred embodiments of the present steering-force detection device, the paired steering-force detection sections are oriented such that respective pressure-receiving directions of the pressure-receiving sections are parallel to each other and perpendicular to a direction in which the paired steering-force detection sections are spaced. This configuration facilitates the manufacture of the detection section casing and the pressure-receiving section casing. Since the received-pressure detection section mounting cavity and the pressure-receiving section mounting cavity are formed in parallel with each other, the machining accuracy of the position, angle, etc. of them is easily improved, which in turn improves the detecting accuracy of the steering-force detection section.

In some preferred embodiments of the present steering-force detection device, respective fitting surfaces of the detection section casing and the pressure-receiving section casing are flat and perpendicular to the pressure-receiving direction of the pressure-receiving section. This configuration improves the positional accuracy between the received-pressure detection section and the pressure-receiving section and allows them to be disposed coaxially.

In some preferred embodiments of the present steering-force detection device, a bolt hole extends in parallel with the pressure-receiving direction of the pressure-receiving section through the detection section casing and the pressure-receiving section casing. The detection section casing and the pressure-receiving section casing are fixed by a bolt fitted into the bolt hole. This configuration allows the detection section casing and the pressure-receiving section casing to be securely fixed to each other with a simple construction. Further, the detection section casing and the pressure-receiving section casing are formed with an opening for respectively mounting the received-pressure detection section and the pressure-receiving section coaxially, and a longitudinal axis of these components is parallel to the bolt hole. Thus, the bolt hole can be machined rather easily.

In some preferred embodiments of the present steering-force detection device, a guide tube extends through the received-pressure detection section mounting cavity of the detection section casing and the pressure-receiving section mounting cavity of the pressure-receiving section casing. Further, the received-pressure detection section is mounted in the guide tube on the detection section casing side, while the pressure-receiving section is mounted in the guide tube on the pressure-receiving section casing side.

With this configuration, the received-pressure detection section and the pressure-receiving section can be disposed coaxially with accuracy. In the conventional art, the received-pressure detection section and the pressure-receiving section are difficult to be align coaxially when the detection section casing and the pressure-receiving section casing, as separate members, are assembled with each other.

Using the guide tube of the present preferred embodiments, however, the received-pressure detection section and the pressure-receiving section can be aligned coaxially with accuracy. As a result, the steering force of the steering handle transmitted to the pressure-receiving section through the pressing member is applied straight from the pressure-receiving section to the received-pressure detection section, improving the detection accuracy of the steering force. The received-pressure detection section and the pressure-receiving section may be mounted inside the guide tube, either partially or wholly.

In some preferred embodiments of the present steering-force detection device, a sealing member is provided for sealing between a fitting portion of the detection section casing and the pressure-receiving section casing and a portion of an outside wall surface of the guide tube. With this configuration, it is possible to seal the fitting portion of the detection section casing and the pressure-receiving section casing. Therefore, in cases where the vehicle in association with the present invention is a vehicle for on-the-water use such as a small planing boat, water can be prevented from entering the guide tube. In other cases where the vehicle is a vehicle for on-land use such as a motorcycle, dust and rainwater can be prevented from entering the guide tube.

In some preferred embodiments of the present steering-force detection device, a width of the mounting opening of the received-pressure detection section mounting cavity is smaller than a diameter of the received-pressure detection section mounting cavity. This configuration prevents the received-pressure detection section from separating from the received-pressure detection section mounting cavity during assembly. Therefore, the received-pressure detection section can be positioned relative to the detection section casing with accuracy and fixed thereto. In cases where the received-pressure detection section is mounted to the detection section casing through the guide tube, the guide tube is prevented from separating from the mounting opening of the received-pressure detection section mounting cavity during assembly.

In order to facilitate the assembly in mounting the received-pressure detection section to the detection section casing through the guide tube, the received-pressure detection section is mounted inside the received-pressure detection section mounting cavity by way of the mounting opening, and then the guide tube is inserted through an opening to the received-pressure detection section mounting cavity facing the pressure-receiving section casing, so that the received-pressure detection section is inserted into the guide tube.

BRIEF DESCRIPTION OF THE DRAWINGS

The preferred embodiments of the present steering-force detection device for a steering handle of a vehicle, illustrating its features, is discussed in detail below. These embodiments depict the novel and non-obvious steering-force detection device shown in the accompanying drawings, which are for illustrative purposes only. These drawings include the following figures, in which like numerals indicate like parts.

DETAILED DESCRIPTION OF THE PREFERRED EMBODIMENTS

Figure 1:
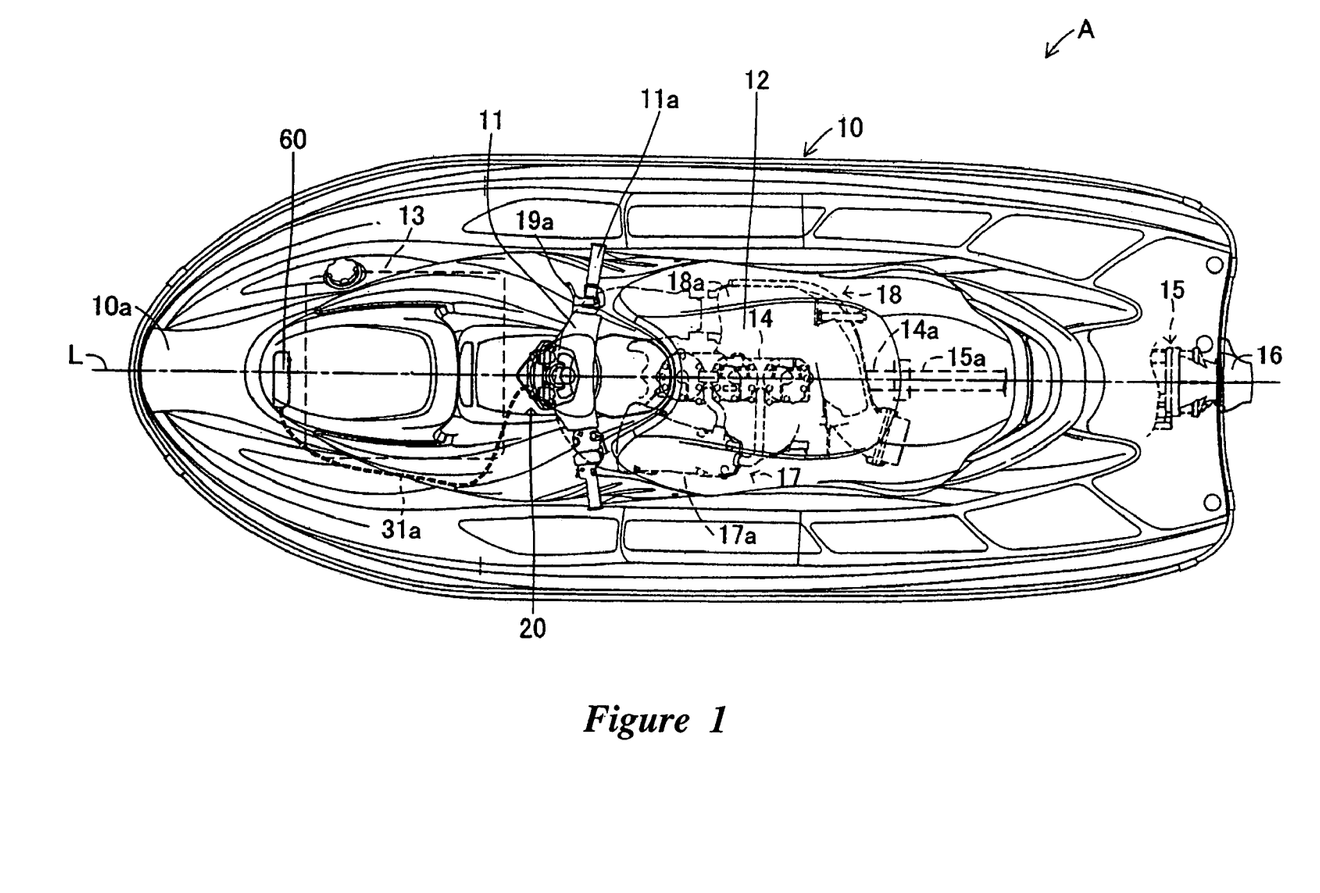
FIG. 1 is a top plan view of a small planing boat including a preferred embodiment of the present steering-force detection device for a steering handle of a vehicle, illustrating portions of the inside of the boat.
Figure 2:
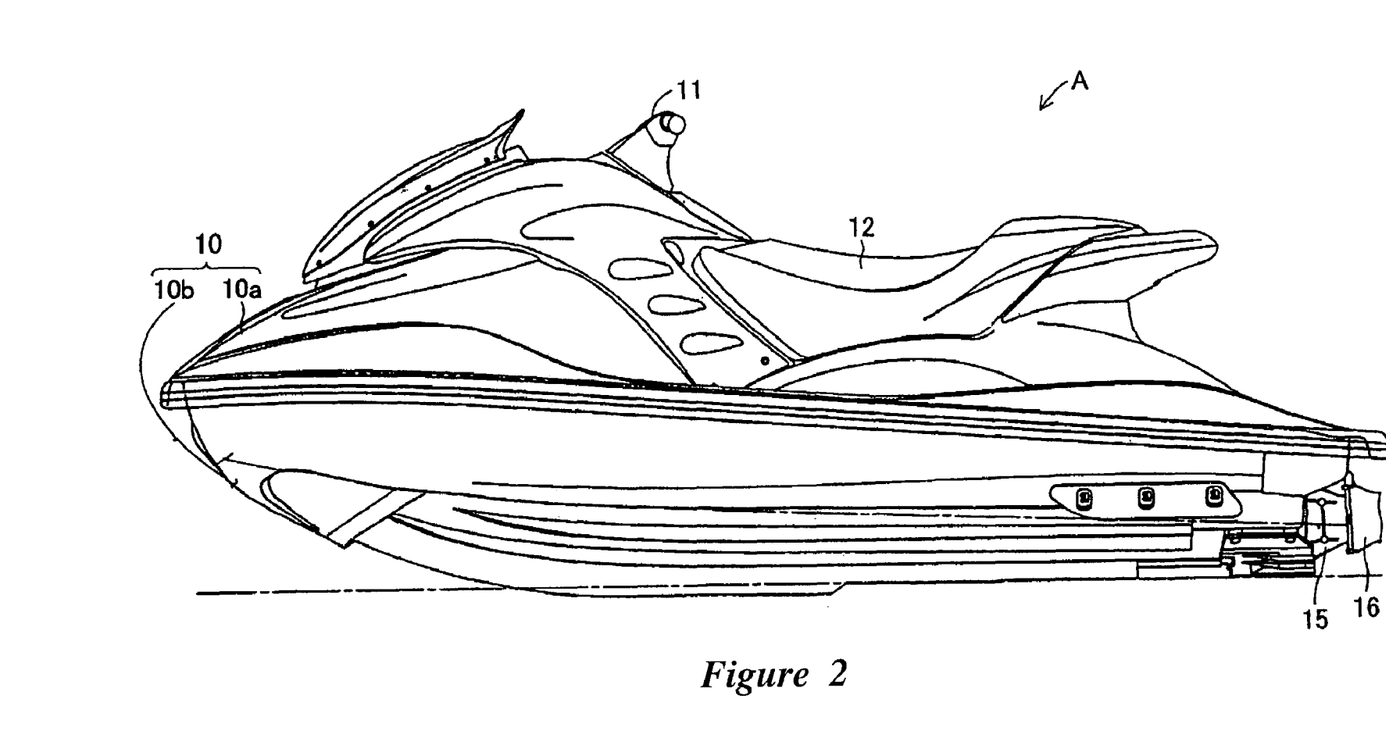
FIG. 2 is a side elevational view of the small planing boat of FIG. 1.

FIGS. 1 and 2 illustrate a small planing boat A (also commonly referred to as a "personal watercraft") including a preferred embodiment of the present steering-force detection device for a steering handle of a vehicle. The steering-force detection device is illustrated in the context of a personal watercraft because it has particular utility in this context. However, the steering-force detection device can also be used in other vehicles, including small jet boats, as well as other watercraft and land vehicles, including, but without limitation, motorcycles.

With reference to FIG. 2, the small planing boat A has a boat body 10, including a deck 10a and a lower hull 10b. The boat body 10 can have steering handlebars 11 located slightly in front of its center on its upper part, and a seat 12 located centrally of the upper part. With reference to FIG. 1, a fuel tank 13 for storing fuel is disposed at the front bottom inside the boat body 10, and an engine 14 is disposed at the center bottom inside the boat body 10.

With continued reference to FIGS. 1 and 2, a propulsion unit 15 is disposed generally centrally in the width direction of the boat body 10 (the portion indicated by a center line L) at the rear end of the boat body 10. The propulsion unit 15 is coupled to the engine 14 via an impeller shaft 15a.

A steering nozzle 16 is mounted to the rear end of the propulsion unit 15. The steering nozzle 16 is coupled to the steering handlebars 11 via a push-pull wire 16a and a steering arm 16b, etc. (see FIG. 4). The rear part of the steering nozzle 16 is pivotable laterally in response to operation of the steering handlebars 11. Pivoting of the steering nozzle 16 changes the direction of travel for the small planing boat A.

The engine 14 is connected to an intake system 17 for guiding a mixture of fuel fed from the fuel tank 13 and air to the engine 14. The engine 14 is also connected to an exhaust system 18 for emitting an exhaust gas from the engine 14 to the outside from the rear end of the boat body 10.

The engine 14 can comprise, for example but without limitation, a two-cycle, three-cylinder engine. However, ht is merely one type of engine that can be used. The engine 14 can optionally have other numbers of cylinders, operate on other combustion principles (e.g., diesel, rotary, four stroke, etc), and have other cylinder configurations (e.g., V-type, W-type, horizontally opposed, etc.).

During operation, the engine 14 takes in an air-fuel mixture at its intake ports, and discharges an exhaust gas through its exhaust ports. The mixture fed into the engine 14 explodes when ignited by an ignition system provided in the engine 14, and the explosion causes pistons provided in the engine 14 to reciprocate up and down. The reciprocating motion of the pistons drives a crankshaft 14a to rotate. The crankshaft 14a is coupled to the impeller shaft 15a, to transmit its rotational force to the impeller shaft 15a and drive the impeller shaft 15a to rotate.

The impeller shaft can be formed from a single shaft, or a plurality of shafts connected together. The rear end of the impeller shaft 15a is coupled to an impeller (not shown) disposed in the propulsion unit 15. When the impeller rotates, thrust is generated and the small planing boat A gains speed.

The propulsion unit 15 has a water inlet opening (not shown) at the bottom of the boat body 10 and a water jet nozzle (not shown) opening at the stem. Seawater introduced from the water inlet is ejected from the water jet nozzle by the rotation of the impeller to generate thrust for the small planing boat A.

With reference to FIG. 2, in the illustrated embodiment, the intake system 17 comprises an intake pipe 17a connected to the engine 14, a throttle body connected to the upstream end of the intake pipe 17a, and may comprise various other components. The intake system 17 takes in outside air and guides it to the engine 14. The air flow rate can be adjusted by opening and closing a throttle valve 19 (FIG. 11) provided in the throttle body. The air fed to the engine 14 is mixed with fuel fed from the fuel tank 13 via a fuel system (not shown).

In the illustrated embodiment, the exhaust system 18 includes an exhaust pipe 18a connected to the engine 14, a tank-shaped water lock connected to the rear end of the exhaust pipe 18a, an exhaust pipe (not shown) connected to the rear portion of the water lock, and can comprise various other components. The exhaust pipe 18a starts at the exhaust port of each cylinder of the engine 14, and merges at a point between the ports and the water lock.

An exhaust pipe extends rearward from the rear portion of the upper surface of the water lock. The exhaust pipe can extend initially upward and then downward and rearward, with its downstream end opening at the lower portion of the rear end of the boat body 10.

Figure 3:
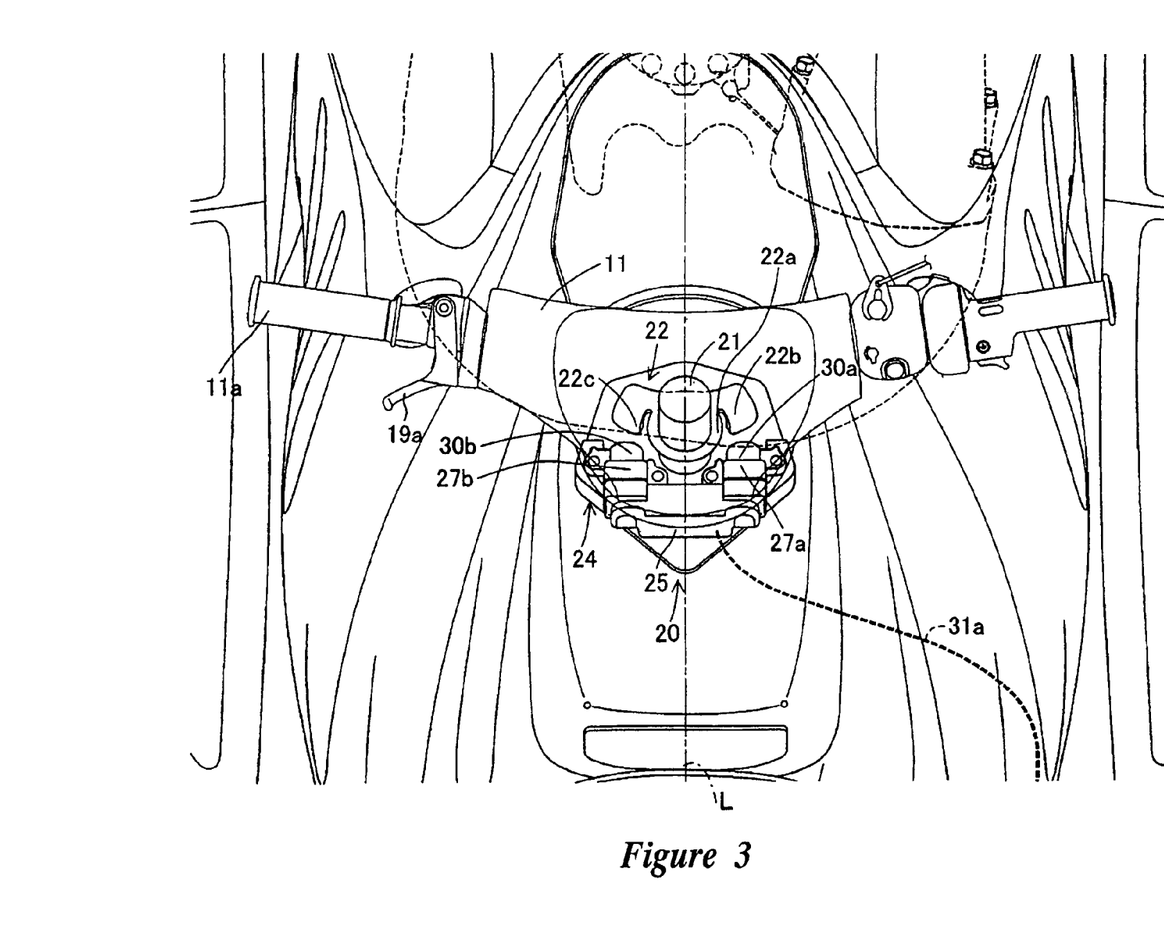
FIG. 3 is an enlarged top plan view of the small planing boat of FIG. 1, illustrating in detail components of a preferred embodiment of the present steering-force detection device.

With reference to FIGS. 2 and 3, the illustrated boat A includes a throttle lever 19a in the vicinity of a grip 11a of the steering handlebars 11. The throttle lever. 19a is supported for rotation around an axis and adapted to move toward/away from the peripheral surface of the grip 11a.

The throttle valve 19 opens and closes in response to operation of the throttle lever 19a. Thus, the throttle lever 19a can be considered to be a power output request device. For example, when the lever 19a is squeezed by an operator, the power output of the engine rises in accordance with the operator's "request" (the extent to which the operator squeezed the lever 19a). The throttle vale 19 can be connected to the throttle lever 19a with a direct wire connection, or the throttle valve 19 can be electronically controlled based on detected movements of the throttle lever 19a. In other embodiments, the power output of the engine 14 can be controlled in other ways without a throttle valve, e.g., throttle less engines using variable valve timing to control air flow to the engine 14.

A preferred embodiment of the present steering-force detection device 20 is housed beneath the steering handlebars 11 and inside the boat body 10. Those of ordinary skill in the art will appreciate that, even though the steering-force detection device 20 is hidden from view inside the boat body 10, it is nevertheless illustrated with solid lines in FIGS. 1 and 3 for easy understanding.

Figure 4:
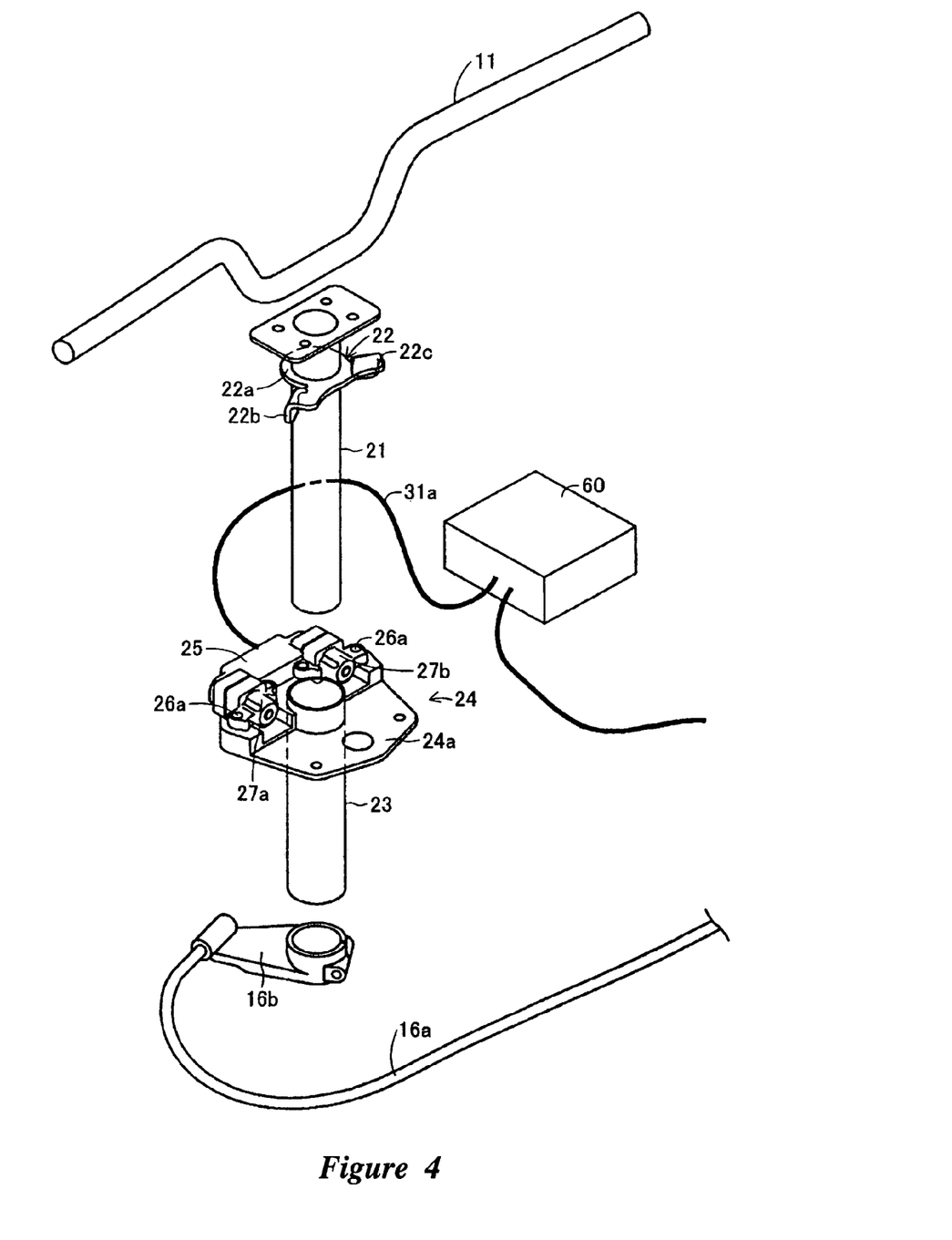
FIG. 4 is an exploded perspective view of a preferred embodiment of the present steering-force detection device, including some of the components of FIG. 3.

With reference to FIGS. 3 and 4, the steering-force detection device 20 can comprise a pressing member 22 attached to a steering shaft 21, which extends generally vertically and is coupled to the center of the steering handlebars 11 for rotation in response to operation of the steering handlebars 11, and a steering-force detection section unit 24, which is fixed to a cylindrical steering shaft receiving section 23 for supporting the steering shaft 21 for rotation. The steering-force detection section unit 24 can be adapted to detect the steering force received from the pressing member 22 when it comes into contact with the pressing member 22. Such contact occurs when the steering shaft 21 is rotated to a predetermined angle.

With particular reference to FIG. 4, the pressing member 22 can comprise a ring-shaped fixed portion 22a that is fixed to the outer peripheral surface of the steering shaft 21. The pressing member 22 can further comprise a pair of L-shaped pressing pieces 22b, 22c. Each pressing piece 22b, 22c can include a horizontal portion projecting obliquely rearward from the fixed portion 22a and a vertical portion extending downward from the front edge of the horizontal portion.

The pressing member 22 can be mounted symmetrically around the steering shaft 21. The vertical portion of the pressing piece 22b can be perpendicular to the center line L when the steering handlebars 11 are rotated clockwise to a maximum steering angle, as viewed from above. Similarly, the vertical portion of the pressing piece 22c can be perpendicular to the center line L when the steering handlebars 11 are rotated counterclockwise to a maximum steering angle, as viewed from above.

Figure 5:
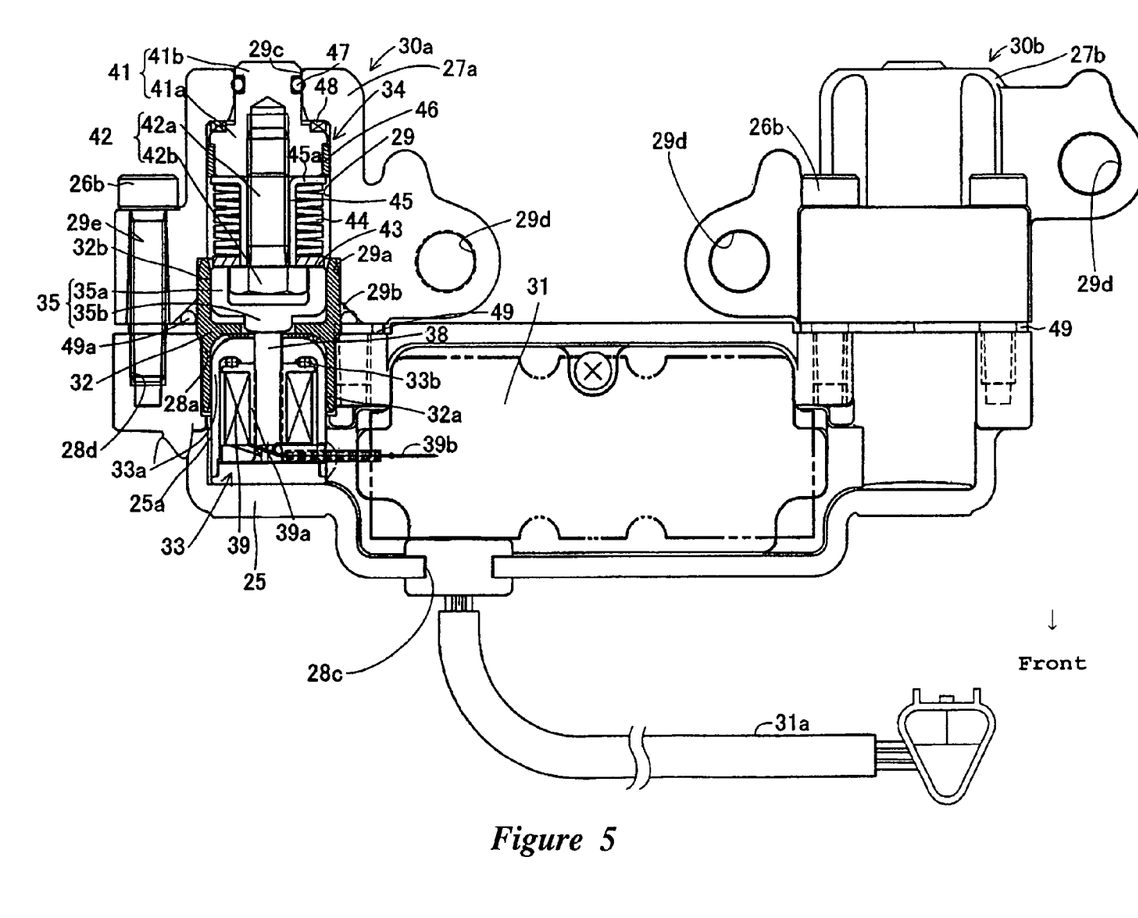
FIG. 5 is a bottom plan view of portions of the steering-force detection device of FIG. 4, including a partial cross-sectional view illustrating interior components of a steering-force detection section unit.

With reference to FIGS. 4 and 5, in the illustrated embodiment the steering-force detection section unit 24 includes a mounting plate 24a, a detection section casing 25, and a pair of pressure-receiving section casings 27a, 27b. The mounting plate 24a can be fixed to the outer peripheral surface of the steering shaft receiving section 23.

The detection section casing 25 can be fixed to the upper surface of the mounting plate 24a by, for example, a bolt (not shown). The pressure-receiving section casings 27a, 27b can be fixed to the upper surface of the mounting plate 24a by, for example, a bolt 26a, and respectively fixed to the left and right ends of the rear end of the detection section casing 25 by, for example, a bolt 26b (FIG. 5).

With reference to FIG. 5, which is a lower plan view, a pair of steering-force detection sections 30a, 30b and an electric circuit board 31 are situated in a recess defined by the mounting plate 24a, the detection section casing 25 and the pair of pressure-receiving section casings 27a, 27b.

Figure 6:
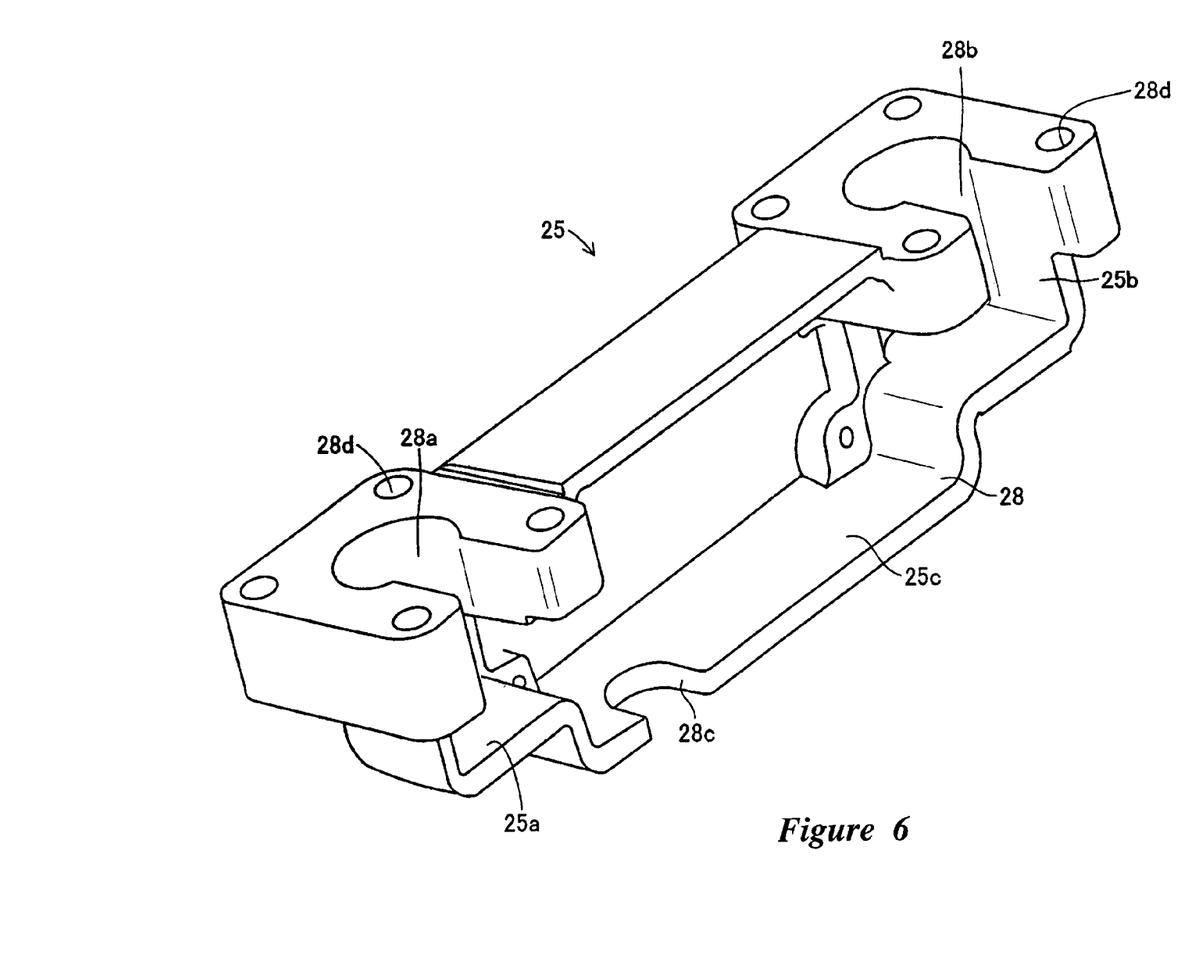
FIG. 6 is a lower perspective view of a detection section casing component of the steering-force detection device of FIG. 4.

With reference to FIG. 6, a portion of the detection section casing 25 facing the mounting plate 24a (the near side in FIG. 6, or the lower surface of the detection section casing 25) forms a mounting opening 28. The mounting opening 28 receives the front portions of the pair of steering-force detection sections 30a, 30b and the electric circuit board 31.

Mounting cavities 25a, 25b can be configured to receive the front portions of the steering-force detection sections 30a, 30b, are can be respectively formed in both the left and right portions inside the detection section casing 25. A circuit board housing recess 25c can be formed in the center portion inside the detection section casing 25.

The mounting cavities 25a, 25b and the circuit board housing recess 25c can be in communication with each other inside the detection section casing 25. Connecting openings 28a, 28b in the rear (upper side in FIG. 6) of the mounting cavities 25a, 25b can be configured to allow communication between the mounting cavities 25a, 25b and the pressure-receiving section casings 27a, 27b.

The connecting openings 28a, 28b can be formed so as to extend perpendicularly to the mounting opening 28. A notch 28c for passing wiring 31a out of the circuit board housing recess 25c can be formed on one side of the front wall of the circuit board housing recess 25c. A plurality of bolt holes 28d for fitting the bolts 26b are formed around the connecting openings 28a, 28b in the rear surface of the detection section casing 25. In the illustrated embodiment, the bolt holes 28d are parallel to the mounting cavities 25a, 25b.

With reference to FIG. 5, in the illustrated embodiment the pressure-receiving section casings 27a, 27b are formed symmetrically with respect to each other. Each of the casings 27a, 27b can include a mounting cavity 29 for mounting the rear portion of the steering-force detection section 30a or 30b (the mounting cavity 29 of the pressure-receiving section casing 27b is not shown).

The pressure-receiving section casings 27a, 27b can be formed symmetrically with respect to each other, and the mounting cavities 25a, 25b, and the steering-force detection sections 30a, 30b can also have the same structure as each other. Therefore, a description of the construction of the pressure-receiving section casing 27a and steering-force detection section 30a is made hereinafter, and that of the pressure-receiving section casing 27b and steering-force detection section 30b is not made.

As shown in FIG. 5, the front end of the mounting cavity 29, which is formed in the pressure-receiving section casing 27a, can include a connecting opening 29a having a diameter slightly larger than the connecting opening 28a of the detection section casing 25, and in communication with the connecting opening 28a. The front end of the connecting opening 29a can be formed with a taper 29b that expands outwardly toward the detection section casing 25.

The rear end of the mounting cavity 29 can be formed with a through-hole 29c of a relatively small diameter. The bottom of the pressure-receiving section casing 27a can include a bolt hole 29d for through which the bolt 26a passes.

A plurality of bolt holes 29e for receiving the bolts 26b can be formed around the mounting cavity 29 in the front surface of the pressure-receiving section casing 27a. In the illustrated embodiment, the bolt holes 29e are parallel to the mounting cavity 29.

With continued reference to FIG. 5, the bolt holes 29e can be in communication with the bolt holes 28d of the detection section casing 25. The number of the bolt holes 29e equals the number of bolt holes 28d.

The mounting cavity 29 can be formed coaxially with the mounting cavity 25a. The bolt hole 29d and the bolt 26a mounted in the bolt hole 29d are set perpendicular to the mounting cavity 29 and the mounting cavity 25a. The rear surface of the detection section casing 25 and the front surface of the pressure-receiving section casing 27a can be set perpendicular to the mounting cavity 29 and the mounting cavity 25a.

The steering-force detection section 30a can comprise a generally cylindrical guide tube 32 disposed across the rear portion of the mounting cavity 25a and the front portion of the mounting cavity 29, a received-pressure detection section 33 mounted in the front portion of the guide tube 32, a pressure-receiving section 34 mounted in the rear portion of the guide tube 32, and a pin 35 interposed between the received-pressure detection section 33 and the pressure-receiving section 34.

Figure 7:
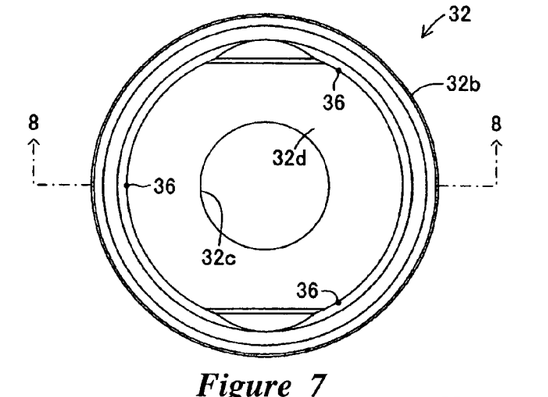
FIG. 7 is a top plan view of a guide tube component of the steering-force detection device of FIG. 4.
Figure 8:
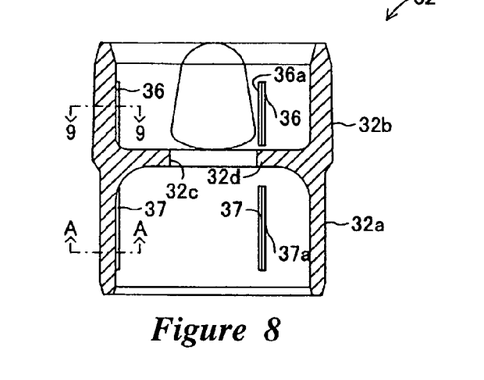
FIG. 8 is a cross-sectional view of the guide tube of FIG. 7, taken along the line 8-8 of FIG. 7.

As shown in FIGS. 7 and 8, the guide tube 32 can comprise a front housing portion 32a having a relatively thin peripheral wall, a rear housing portion 32b having a relatively thick peripheral wall, and a partition wall 32d formed inside the guide wall 32 between the front housing portion 32a and the rear housing portion 32b. The front and rear housing portions 32a, 32b can have generally the same inside diameter as one another.

Figure 9:
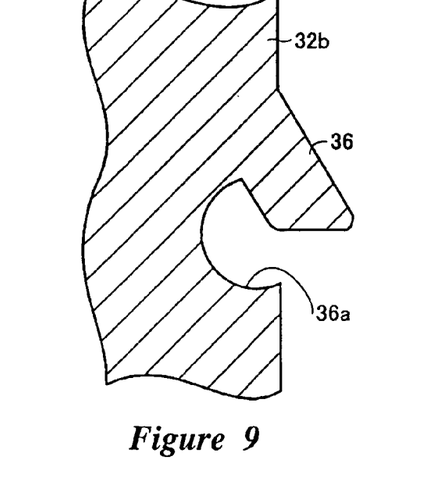
FIG. 9 is a partial cross-sectional view of the guide tube of FIG. 8, taken along the line 9-9 of FIG. 8.

The partition wall 32d can include a hole 32c in its center. The inner peripheral surface of the rear housing portion 32b can include three ribs 36 extending along its axis at regular intervals (120° in this embodiment) circumferentially. As shown in FIG. 9 each rib 36 can project from the inner peripheral surface of the rear housing portion 32b obliquely with respect to the center axis.

With continued reference to FIG. 9, a groove 36a having a generally semicircular cross-section can be provided alongside the rib 36. The groove 36a can be located at a position where the inner peripheral surface of the rear housing portion 32b and an extension of a line connecting the tip of the rib 36 and the center axis of the rear housing portion 32b intersect.

With this configuration, when the tip of the rib 36 is pressed toward the inner peripheral surface of the rear housing portion 32b, the tip of the rib 36 elastically deforms to retract into the groove 36a. Ribs 37 and grooves 37a, formed similar to the ribs 36 and the grooves 36a, are formed in the inner peripheral surface of the front housing portion 32a. The circumferential arrangement of each rib 37 and groove 37a is inverted with respect to that of each rib 36 and groove 36a. That is, the section taken along the line A-A in FIG. 8 would be the same as FIG. 9.

With reference to FIG. 5, the guide tube 32 can be mounted coaxially with the mounting cavity 29 and the mounting cavity 25a, with the front housing portion 32a inserted into the connecting opening 28a and with the rear housing portion 32b inserted into the connecting opening 29a.

With continued reference to FIG. 5, the received-pressure detection section 33 can include a rod-like magnetic body 38 disposed in a cylindrical casing 33a, and in axial alignment with the casing 33a. A bobbin 39a around which a coil 39 is wound can be mounted on the outer peripheral surface of the magnetic body 38.

An O-ring 33b for sealing between the casing 33a and the coil 39 can be mounted between the rear end of the inside surface of the casing 33a and the bobbin 39a. The received-pressure detection section 33 can be mounted inside the front housing portion 32a coaxially with the guide tube 32, so that the rear end of the magnetic body 38 is projected out of the rear end of the casing 33a and directed to the hole 32c (FIG. 8) of the guide tube 32.

An end of a lead 39b can be connected to the coil 39 and can extend into the circuit board housing recess 25c to be connected to the electric circuit board 31. The magnetic properties of the magnetic body 38 change depending on the load being added thereto. The coil 39 converts changes in magnetic properties of the magnetic body 38 into changes in electric voltage.

With continued reference to FIG. 5, the pressure-receiving section 34 can comprise a pressure-receiving member 41, a bolt 42 fixed to the pressure-receiving member 42, a ring-shaped plain washer 43, a plurality of spring members 44, and a cylindrical collar 45 including a flange portion 45a at its rear end. These components are mounted to a shaft portion 42a of the bolt 42.

The spring members 44 can comprise, for example, disc springs. The pressure-receiving member 41 can comprises a large-diameter portion 41a on the front side, and a small-diameter portion 41b on the rear side. The pressure-receiving member 41 can be disposed in such a manner that its rear end projects from the through hole 29c of the pressure-receiving section casing 27a. The pressure-receiving member 41 can be mounted so as to be movable forward and rearward inside the pressure-receiving section casing 27a.

In the illustrated embodiment, a bearing 46 is mounted on the outer peripheral surface of the large-diameter portion 41a, and an O-ring 47 is mounted on the outer peripheral surface of the small-diameter portion 41b. The pressure-receiving member 41 is adapted to move smoothly with respect to the pressure-receiving section casing 27a in sealed relation with the pressure-receiving section casing 27a.

A wave washer 48 can be mounted between the rear end surface of the large-diameter portion 41a and the inside wall of the pressure-receiving section casing 27a. The shaft portion 42a of the bolt 42 is inserted into the plain washer 43 and the disc springs 44, and the collar 45 is inserted between the shaft portion 42a and the plain washer 43 and disc springs 44. The bolt 42 in this state is fixed to the large-diameter portion 41a of the pressure-receiving member 41.

In one embodiment, the bolt 42 is fastened to the pressure-receiving member 41 so that the disc springs 44 are subjected to a predetermined initial load. With this configuration, the pressure-receiving member 41 preferably does not move, even when a forward force is applied to the rear end of the pressure-receiving member 41, as long as the force does not exceed the initial load. Only when the pressure-receiving member 41 is subjected to a force exceeding the initial load, the disc springs 44 contract and thus the pressure-receiving member 41 moves. As a result, the moving range of the pressure-receiving member 41 can be minimized.

A pin 35 can be mounted between the received-pressure detection section 33 and the pressure-receiving section 34. The pin 35 can comprise a pin body 35a and a projection 35b. The pin body 35a can contact the front surface of the plain washer 43 and can cover a head portion 42b of the bolt 42. The projection 35b contacts the magnetic body 38 of the received-pressure detection section 33 through the hole 32c of the guide tube 32. A gap is provided inside the pin body 35a between the rear surface of the pin body 35a and the head portion 42b of the bolt 42.

When the pressure-receiving member 41 is subjected to a load exceeding the initial load, the disc springs 44 contract, and the pressure-receiving member 41, the bolt 42 and the collar 45 move forward. Movement of the plain washer 43 is restricted by the pin 35, so that the plain washer 43 remains motionless. The pressure-receiving section 34 and the pin 35 are disposed coaxially with the received-pressure detection section 33. Therefore, the load applied to the pressure-receiving member 41 is transmitted to the received-pressure detection section 33 linearly via the disc springs 44, the plain washer 43, and the pin 35.

When the pressure-receiving member 41 is displaced so that its rear surface is flush with the rear surface of the pressure-receiving section casing 27a, the pressing piece 22b of the pressing member 22 (FIG. 4), which presses against the pressure-receiving member 41, comes in contact with the pressure-receiving section casing 27a. Thus, no additional load can be applied to the pressure-receiving member 41, and the pressure-receiving member 41 is unlikely to be damaged.

In the illustrated embodiment, a plate-like sealing material 49 (e.g., a gasket) is provided in the boundary surface between the detection section casing 25 and the pressure-receiving section casings 27a, 27b. An O-ring 49a for sealing can be provided in the taper 29b, and is surrounded by the pressure-receiving section casing 27a (27b), the guide tube 32, and the sealing material 49. A gap between the detection section casing 25 and the pressure-receiving section casing 27a or 27b, and gaps between other portions are preferably sealed, as for example with a resin material that is filled and set therein.

Figure 10:
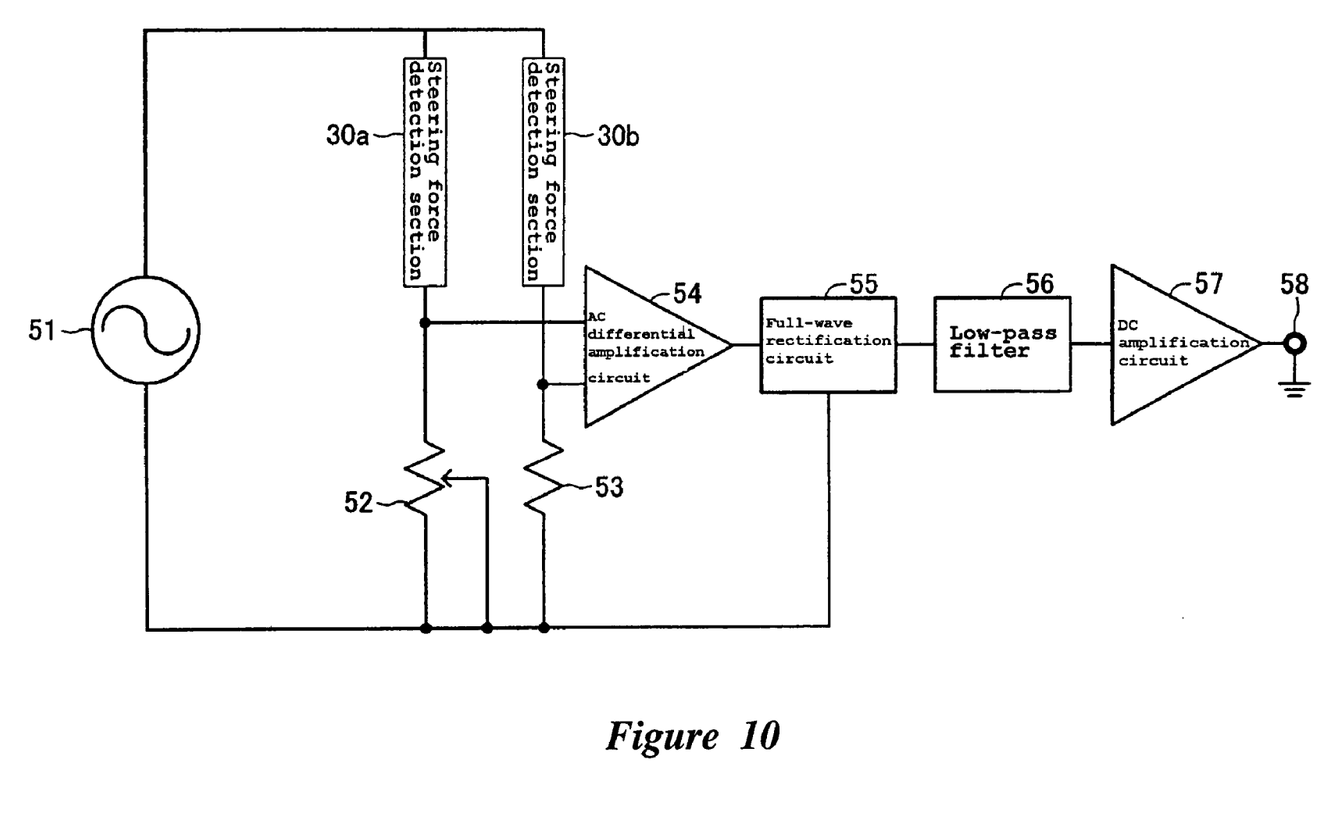
FIG. 10 is a block diagram of a preferred embodiment of a circuit provided in an electric circuit board of the present steering-force detection device.

With reference to FIG. 10, the steering-force detection sections 30a, 30b can be connected to the electric circuit board 31. The electric circuit board 31 can include a circuit, such as an AC oscillating circuit 51.

The AC oscillating circuit 51 can be connected to the respective received-pressure detection sections 33 of the steering-force detection sections 30a, 30b to apply AC current to the coils 39 (FIG. 5) of the received-pressure detection sections 33. A variable resistor 52 can be connected to the received-pressure detection section 33 of the steering-force detection section 30a. Additionally, a bridge fixed resistor 53 can be connected to the received-pressure detection section 33 of the steering-force detection section 30b.

The difference in output voltage between the respective received-pressure detection sections 33 of the steering-force detection sections 30a, 30b is amplified by an AC differential amplification circuit 54, and then rectified by a full-wave rectification circuit 55. Further, low-frequency components can be extracted by a low-pass filter 56, and a terminal 58 outputs a signal voltage amplified by a DC amplification circuit 57. Wire 31a (FIG. 5) can connect the terminal 58 to a controller 60 (FIG. 11), and carry the signal voltage according to the load detected by the steering-force detection sections 30a, 30b from the terminal 58 to the controller 60.

Figure 11:
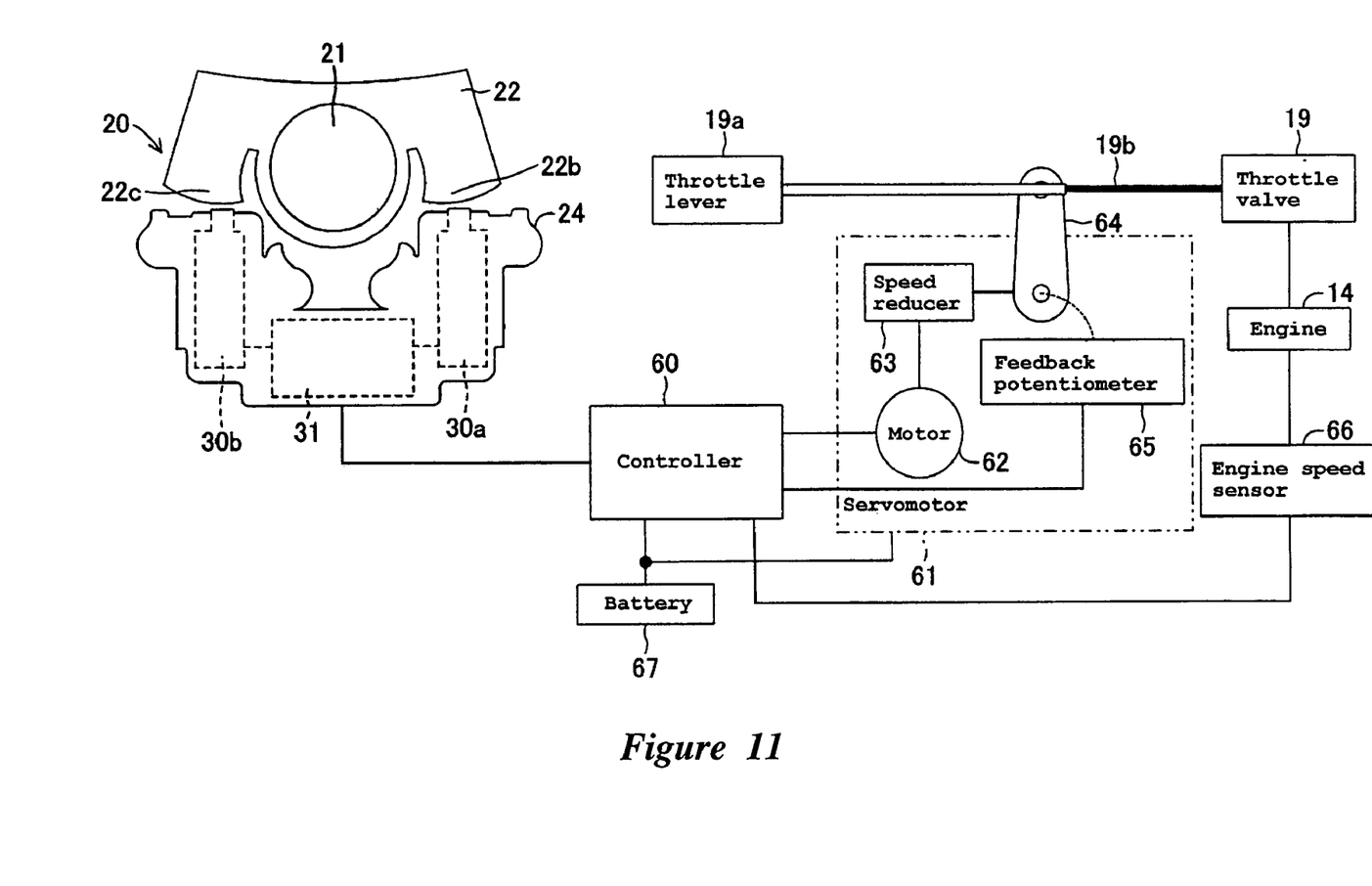
FIG. 11 is a block diagram illustrating devices controlled by a controller in a preferred embodiment of the present steering-force detection device.

With reference to FIG. 11, when the controller 60 receives a signal voltage representing the steering force from the steering-force detection device 20 and the signal voltage is more than a predetermined value, the controller 60 actuates a servomotor 61 so as to change the power output or speed of the engine 14.

The servomotor 61 can be configured to reduce the speed of a motor 62 by means of a speed reducer 63, and transmits to an arm 64 so as to move a throttle wire 19b coupling the throttle lever 19a and the throttle valve 19. The throttle valve 19 position is thus changed without any operation of the throttle lever 19a. In some embodiments, the controller 60 can be configured to cause the servo motor 61 to increase the opening of the throttle valve 19 when the voltage is above a predetermined value.

The arm 64 can include a feedback potentiometer 65 for detecting the swing angle of the arm 64. The controller 60 can be configured to continue to actuate the motor 62 until the swing angle of the arm 64 reaches a target angle, which is set based on the signal voltage from the steering-force detection device 20. The controller 60 can be configured to allow the throttle valve 19 to open to a degree according to the output from the steering-force detection device 20 (steering force applied to the steering handlebars 11 by the operator), to control the output of the engine 14.

With continued reference to FIG. 11, the engine 14 can include an engine speed sensor 66 for detecting the rotational speed of the crankshaft 14a. Data signals on the engine speed detected by the engine speed sensor 66 can be transmitted to the controller 60. A battery 67 can be connected to the controller 60 and the servomotor 61, to supply them with power for operation.

To operate the small planing boat A having the above configuration, an operator first turns on a switch (not shown), which can be provided in the vicinity of the steering handlebars 11, to bring the small planing boat A to an operable state. Then, the operator grasps the grip 11a of the steering handlebars 11, places his/her fingers on the throttle lever 19a, and moves the throttle lever 19a toward the grip 11a. The throttle wire 19b is thus drawn and the throttle valve 19 opens.

As the throttle lever 19a is moved closer to the grip 11a, the throttle opening increases causing the power output and/or speed of the engine 14 to rise and thus the small planing boat A accelerates. As the throttle lever 19a is moved farther away from the grip 11a, the throttle opening decreases and the small planing boat A decelerates.

By operating the throttle lever 19a for speed adjustment, and rotating the steering handlebars 11, the small planing boat A runs in a direction that varies according to operation of the steering handlebars 11. The push-pull wire 16a moves in response to the steering handlebars 11 to swing the steering nozzle 16 for allowing changes in running direction.

In order to dock the small planing boat A, for example, the throttle lever 19a is released so as to allow the throttle lever 19 a to return to the position farthest away from the grip 11a, thereby allowing the engine to return to idle speed operation. When the steering handlebars 11 are rotated, either clockwise or counterclockwise, to their maximum steering angle, one of the pressing pieces 22b, 22c applies pressure to the pressure-receiving section 34 of the corresponding steering-force detection section 30a, 30b. This pressure triggers the steering-force detection device 20 to transmit a signal voltage representing the steering force to the controller 60.

The controller 60 then actuates the servomotor 61 according to the signal voltage value, to further open the throttle valve 19. As a result, the small planing boat A accelerates, improving the steering performance of the small planing boat A. The operator is thus able to move the boat A to its target position at a low speed using only the steering handlebars 11, rather than having to operate the steering handlebars 11 while at the same time manipulating the throttle lever 19a for minute adjustments.

In the steering-force detection device 20 as described above, the paired received-pressure detection sections 33 and the electric circuit board 31 can be inserted into the detection section casing 25 through the mounting opening 28 (FIG. 6) and be fixed therein. This configuration facilitates the assembly of the paired received-pressure detection sections 33 and the electric circuit board 31 with the detection section casing 25.

A preferred method for assembling the received-pressure detection sections 33 and the guide tubes 32 with the detection section casing 25 can proceed as described below. The paired received-pressure detection sections 33 can be connected to the electric circuit board 31. The received-pressure detection sections 33 and the electric circuit board 31 can then be mounted inside the detection section casing 25 through the mounting opening 28.

Then, the received-pressure detection sections 33 can be inserted into the guide tubes 32 and the assemblies of the guide tubes 32 and the received-pressure detection sections 33 can be inserted through the connecting openings 28a, 28b. The pins 35 and the pressure-receiving sections 34 are then mounted to the guide tubes 32, and the pressure-receiving section casings 27a, 27b are mounted therearound, to complete assembly of the steering-force detection section unit 24.

The paired received-pressure detection sections 33 and the electric circuit board 31 can be mounted to the detection section casing 25 so as not to rattle. Since the received-pressure detection section 33 and the pressure-receiving section 34 are mounted through the guide tube 32, they can be mounted coaxially with accuracy, even when the detection section casing 25 and the pressure-receiving section casings 27a, 27b are separate members. This configuration allows the steering force of the steering handlebars 11, which is transmitted to the pressure-receiving section 34 through the pressing member 22, to be applied straight from the pressure-receiving section 34 to the received-pressure detection section 33. This configuration also improves the detection accuracy of the present steering-force detection device.

The ribs 36, 37 and grooves 36a, 37a on the inside wall surfaces of the front housing portion 32a and rear housing portion 32b of the guide tube 32 prevent the received-pressure detection section 33 and the pressure-receiving section 34 from rattling. At the same time, the configuration of the ribs 36, 37 and grooves 36a, 37a (FIG. 9) prevents the ribs 36 and 37 from being shaved off when the received-pressure detection section 33 and the pressure-receiving section 34 are inserted into the guide tube 32. Such shavings might tend to gather in the guide tube 32 and intrude between the received-pressure detection section 33 and the pressure-receiving section 34, which would diminish the detection accuracy of the present steering-force detection device.

The O-rings 33b, 47, 49a seal respective portions of the steering-force detection section unit 24, as described above.

Resin materials may be added to fill gaps in other portions, thus preventing water from entering the steering-force detection section unit 24.

The detection section casing 25 and the pressure-receiving section casings 27a, 27b are assembled to house respective members. These components are preferably manufactured within close tolerances to improve the positional accuracy between the received-pressure detection section 33 and the pressure-receiving section 34. In the illustrated configuration, the received-pressure detection section 33 and the pressure-receiving section 34 are also disposed coaxially.

In the steering-force detection device 20, the preloaded and contracted disc springs 44 are provided between the pressure-receiving member 41 and the plain washer 43. Therefore, the pressure-receiving member 41 is not displaced until the steering force of the steering handlebars 11, which is received by the pressure-receiving member 41 through the pressing member 22, reaches the level of the preload on the disc springs 44. This configuration substantially reduces the size of the steering angle required for detecting the steering force, thus securing a larger steering angle for steering operations without triggering additional power output from the engine 14.

The steering-force detection device 20 as described above is not limited to the foregoing embodiments, and may be modified as appropriate to suit particular applications. For example, the connecting openings 28a, 28b of the mounting cavities 25a, 25b of the detection section casing 25 may have a smaller width than the mounting cavities 25a, 25b. This configuration secures the received-pressure detection sections 33 in the guide tubes 32 so that they do not separate from the mounting cavities 25a, 25b during assembly. Therefore, the received-pressure detection sections 33 can be positioned relative to the detection section casing 25 with accuracy and fixed thereto.

In the foregoing embodiment, two pressure-receiving section casings 27a, 27b are provided. However, the pressure-receiving section casing may be of a one-piece type having two mounting cavities 29. As an alternative to the received-pressure detection section 33, a detection device of another type that can detect the pressure-receiving state of the pressure-receiving section 34 in another manner may be used. The steering-force detection device 24 may be applied not only to the foregoing small planing boat A, but also to various vehicles including motorcycles, automobiles, and snowmobiles. The steering-force detection device may also be used for control of various devices installed in these vehicles. The configuration of the rest of the small planing boat A according to the foregoing embodiment may be modified as appropriate.

The above includes a description of the best mode contemplated for carrying out the present steering-force detection device for a steering handle of a vehicle, and of the manner and process of making and using it, in such full, clear, concise, and exact terms as to enable any person skilled in the art to which it pertains to make and use this steering-force detection device. This steering-force detection device can, however, be modified and alternate constructions from that discussed above that are fully equivalent can also be used. Consequently, the above-described steering-force detection devices are not limited to the particular embodiments disclosed. On the contrary, this steering-force detection device covers all modifications and alternate constructions coming within the spirit and scope of the steering-force detection device as generally expressed by the following claims.

What is claimed is:

1. A steering-force detection device for a steering handle of a vehicle, comprising:
    a pair of steering-force detection sections, each including a pressure-receiving section and a received-pressure detection section, the steering-force detection sections being spaced from one another and located in a vicinity of a steering shaft connected to the steering handle so as to be rotatable in opposite directions according to operation of the steering handle;
    a pair of pressing sections provided in the steering handle or steering shaft, each pressing section being adapted to press a corresponding one of the pressure-receiving sections when the steering handle is rotated to its maximum steering angle in either direction;
    an electric circuit board integrally connected to the received-pressure detection sections;
    a pressure-receiving section casing, including a pressure-receiving section mounting cavity for housing the pressure-receiving section; and
    a detection section casing formed in a continuous manner with two received-pressure detection section mounting cavities for housing the received-pressure detection sections, and a circuit board housing recess for housing the electric circuit board;
    the steering-force detection device being adapted to detect a steering force of the steering handle by detecting, with the received-pressure detection sections, a pressure-receiving state of the pressure-receiving sections, when the pressure-receiving sections are pressed by the pressing sections;
    wherein the two received-pressure detection section mounting cavities are formed along a pressure-receiving direction of the pressure-receiving section, and the two received-pressure detection section mounting cavities and the circuit board housing recess are each formed with a mounting opening for the received-pressure detection section and the electric circuit board, respectively, and the mounting openings are formed in the same direction as each other and perpendicularly to the pressure-receiving direction of the pressure-receiving section.

2. The steering-force detection device of claim 1, wherein the paired steering- force detection sections are disposed in such a manner that respective pressure-receiving directions of the pressure-receiving sections are parallel to each other and perpendicular to a direction in which the paired steering-force detection sections are spaced.

3. The steering-force detection device of claim 1, wherein respective fitting surfaces of the detection section casing and the pressure-receiving section casing are flat and perpendicular to the pressure-receiving direction of the pressure-receiving section.

4. The steering-force detection device of claim 1, wherein a bolt hole extends in parallel with the pressure-receiving direction of the pressure-receiving section through the detection section casing and the pressure-receiving section casing, and the detection section casing and the pressure-receiving section casing are fixed to one another by a bolt fitted into the bolt hole.

5. The steering-force detection device of claim 1, wherein a guide tube is mounted across the received-pressure detection section mounting cavity of the detection section casing and the pressure-receiving section mounting cavity of the pressure-receiving section casing, and the received-pressure detection section is mounted in the guide tube on the detection section casing side while the pressure-receiving section is mounted in the guide tube on the pressure-receiving section casing side.

6. The steering-force detection device of claim 5, wherein a sealing member seals a space between a fitting portion of the detection section casing and the pressure-receiving section casing and a portion of an outside wall surface of the guide tube corresponding to the fitting portion.

7. The steering-force detection device of claim 1, wherein a width of the mounting opening of the received-pressure detection section mounting cavity for the received-pressure detection section is smaller than a width of the received-pressure detection section mounting cavity.

* * * * *